Oct. 22, 1935.  A. D. WISEMAN  2,017,881
DENTAL TOOL
Filed July 5, 1932
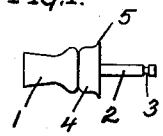
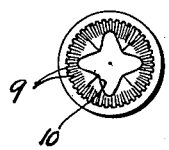
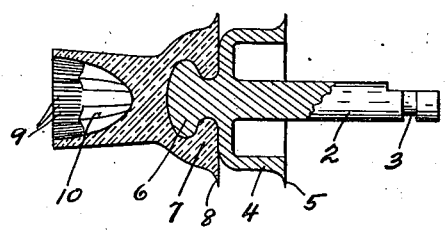
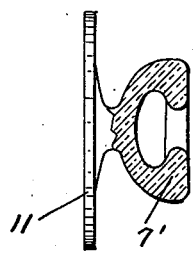
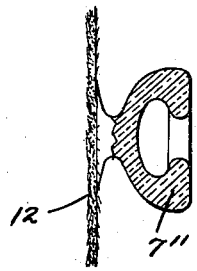
INVENTOR.
ADOLPH D. WISEMAN
BY
ATTORNEYS.

Patented Oct. 22, 1935

2,017,881

UNITED STATES PATENT OFFICE 2,017,881

DENTAL TOOL

Adolph D. Wiseman, San Francisco, Calif.

Application July 5, 1932, Serial No. 620,772

7 Claims. (Cl. 32—59)

This invention relates to dental tools as used to grind and polish the tartar from teeth and the objects of the invention are to provide improvements in such devices whereby the tools may be easily changed or applied to the mandrel of the dental engine and which will be cheaper and more sanitary than the devices heretofore in use.

Other features and advantages of the invention will appear in the following description and accompanying drawing.

In the drawing Fig. 1 is a full size side view of a rubber polishing cup and shank made in accordance with my invention.

Fig. 2 is a greatly enlarged longitudinal section of a cup and shank as per Fig. 1 showing other features.

Fig. 3 is an end view of the cup of Fig. 2.

Fig. 4 is an enlarged side view partly in section of a grinding disk embodying the invention.

Fig. 5 is similar to that of Fig. 4 but showing a circular brush.

The small soft rubber cups used by dentists for polishing teeth have been equipped with various devices for attaching them to the chuck or operating head of the dental engine, such for instance as screw shanks, spring snap shanks, etc., but most of these are intricate and expensive to make and easily become clogged with the powdered pumice or other abrasive or polishing compounds used. In my improved polishing cup I do away with all mechanical locking devices, threads, etc., such as heretofore used, and rely solely on a round soft rubber socket which simply "buttons" over a bulbous end of a tool shank left in place in the engine head, and which permits the placing or removal of any kind of a polishing or grinding tool in a second of time, even while the engine is going, and this without closely observing the parts or trying to match flat spaces, spring notches, screw threads and the like, or danger of getting powder into them.

In the drawing I show the invention applied to a rubber polishing cup, grinding disk, and circular brush, the cup adaptation however showing the greatest combined advantages.

Fig. 1 shows the soft rubber cup 1 frictionally seated over the end of a metal shank 2 which fits into the engine head and locks in place as by means of the usual flattened end and groove 3 or any other means not involved in the present invention. The shank 2 is provided with a bell-shaped skirt 4 with a thin outwardly directed flange 5 so as to throw any saliva outward by centrifugal force when it reaches this point and prevent it from crawling down over the head of the machine or dripping where not desired.

In the enlarged Fig. 2 this skirt and saliva flange is shown more clearly, as well as the ball-like end 6 of the shank over which the soft resilient rubber socket 7 at the rear of the cup buttons snugly. This socket is made with a relatively heavy wall so as to enclose the bulbous head very tightly when pushed over, and it preferably carries an outwardly projecting thin taper edge flange 8 as an additional saliva thrower, the edge of the flange though thin and sharp, being of soft rubber, cannot cut the fingers in applying or changing tools.

It is common in such polishing cups to provide very fine ribs as at 9 around the inner wall to assist in holding the abrasive powder, but I have found a decided advantage to form several very heavy ribs 10 at the bottom of the cup as it holds the reserve powder much longer and gives much greater resistance against flattening out in hard work, and in effect forms a deeper bore of reduced diameter to hold reserve powder.

Fig. 4 shows the soft resilient rubber socket 7' applied to a dental grinding disk 11, and Fig. 5 a similar socket 7'' applied to a small circular dental polishing or cleaning brush 12, both figures being greatly enlarged. The construction permits any of the devices, or others of any form desired, to be quickly interchanged on the same shank 2 by simply buttoning it over without removing the shank from the holder or engine head at the end of the flexible engine shaft.

From the construction it is manifest that grit can never get into the metal working parts of the apparatus and since there are no metal notches, grooves, threads, or the like, ever exposed to the secretions, the utmost sanitation is assured.

In operation, the pressure exerted upon the tool pushes the socket more tightly against the ball as well as the lower end of the socket against the somewhat complementarily formed outer surface of the bell-like skirt so that no slippage at all occurs, but the parts grip tighter with increased pressure.

Having thus described my invention, what I claim is:

1. A dental tool comprising a soft rubber tooth polishing cup adapted to hold an abrasive powder, a reversely directed soft rubber socket at the base of the cup provided with a wide outer margin of greater diameter than the cup arranged and adapted to cooperate with a rotary dental tool shank having a bulbous end fitting frictionally within the socket and a flange bearing tightly against the surface of the wide outer margin of the socket to thereby transmit rotary motion to the cup without slipping when in use against a tooth.

2. A dental tool comprising a soft rubber tooth polishing cup adapted to hold an abrasive powder, a reversely directed soft rubber socket at the base of the cup provided with a wide flat outer margin of greater diameter than the cup arranged and adapted to cooperate with a rotary dental tool shank having a bulbous end fitting frictionally within the socket and a flange bearing tightly against the surface of the wide outer margin of the socket to thereby transmit rotary motion to the cup without slipping when in use against a tooth, and a sharp radially projecting soft rubber flange formed on the margin of the socket extending radially beyond the same.

3. A dental tool comprising a rotary metal tool shank provided with an enlarged bulbous outer end and a radially projecting flange at the base of the bulbous end, and a soft rubber tooth polishing cup provided with an enlarged rearwardly extending base formed with a socket adapted to snap tightly and resiliently over said bulbous end and provided with a wide outer rim seating tightly against the flange of said shank and adapted to seat tighter thereagainst as pressure is applied axially against the outer end of the cup and whereby the frictional grip set up between the combination of the bulb in the socket and enlarged base of the socket against the flange will effectually transmit rotary motion to the cup in use.

4. A dental tool comprising a metal tool shank provided with an enlarged bulbous end and a metal cup at the base of the bulbous end with a flat bottom directed outwardly, and a dental tool formed with a soft rubber socket adapted to snap tightly over said bulbous end and provided with a wide flat rim adapted to seat against the outer bottom end of the cup.

5. A soft rubber dental polishing cup formed with a plurality of small internal ribs around its interior at its upper edge, and a lesser number of thicker ribs within the cup terminating at their upper ends about half way down the cup.

6. A soft rubber dental polishing cup formed with a plurality of relatively thick internal ribs around its interior terminating at their upper ends about half way down in the cup and forming a central reservoir for reserve grinding powder below the more flexible upper portion of the cup and which powder may gradually escape between the ribs when the cup is in use against a tooth.

7. The combination of a dental tool provided with a soft rubber rearwardly enlarged base with a socket formed therein, said base provided with a wide outer margin and arranged and adapted to cooperate with a tool shank provided with a bulbous end fitting tightly into said socket and further provided with a radial flange seating against the outer surface of the wide socket margin and adapted to seat more tightly thereagainst as pressure is applied axially against said tool so as to prevent slippage of the wide socket margin on said radial flange.

ADOLPH D. WISEMAN.